(12) United States Patent
Ueda et al.

(10) Patent No.: US 7,703,277 B2
(45) Date of Patent: Apr. 27, 2010

(54) EXHAUST GAS PURIFYING APPARATUS FOR INTERNAL COMBUSTION ENGINE

(75) Inventors: Takanori Ueda, Susono (JP); Tametoshi Mizuta, Susono (JP); Takashi Karita, Susono (JP); Tomihisa Oda, Numazu (JP); Kuniaki Niimi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/791,139

(22) PCT Filed: Feb. 3, 2006

(86) PCT No.: PCT/JP2006/302296

§ 371 (c)(1),
(2), (4) Date: May 21, 2007

(87) PCT Pub. No.: WO2006/083026

PCT Pub. Date: Aug. 10, 2006

(65) Prior Publication Data

US 2008/0053075 A1 Mar. 6, 2008

(30) Foreign Application Priority Data

Feb. 4, 2005 (JP) .............................. 2005-029649

(51) Int. Cl.
*F01N 3/00* (2006.01)
(52) U.S. Cl. .............................. 60/286; 60/295; 60/301; 60/303
(58) Field of Classification Search .................. 60/286, 60/287, 288, 301, 303
See application file for complete search history.

(56) References Cited

U.S. PATENT DOCUMENTS

| | | | | | |
|---|---|---|---|---|---|
| 3,195,520 | A | * | 7/1965 | Simko | 123/260 |
| 5,365,734 | A | * | 11/1994 | Takeshima | 60/288 |
| 5,406,790 | A | * | 4/1995 | Hirota et al. | 60/276 |
| 5,934,073 | A | * | 8/1999 | Gieshoff et al. | 60/320 |
| 6,048,510 | A | * | 4/2000 | Zauderer | 423/235 |
| 6,105,365 | A | * | 8/2000 | Deeba et al. | 60/274 |
| 6,173,568 | B1 | | 1/2001 | Zurbig et al. | |
| 6,823,664 | B2 | * | 11/2004 | Nakatani et al. | 60/295 |

FOREIGN PATENT DOCUMENTS

| | | |
|---|---|---|
| DE | 198 55 385 A1 | 6/2000 |
| JP | A 56-104110 | 8/1981 |
| JP | Y2 7-16014 | 4/1995 |
| JP | B2 2727906 | 12/1997 |
| JP | A 2003-106142 | 4/2003 |
| JP | A 2003-184551 | 7/2003 |
| WO | WO 2004/046514 | 6/2004 |

* cited by examiner

*Primary Examiner*—Thomas E Denion
*Assistant Examiner*—Diem Tran
(74) *Attorney, Agent, or Firm*—Oliff & Berridge, PLC

(57) ABSTRACT

An exhaust gas purifying apparatus for an internal combustion engine comprises a casing which forms a part of an exhaust passage of the internal combustion engine and houses therein an occlusion-reduction type NOx catalyst and a reducing agent supply device which supplies a reducing agent to an interior of the casing on an upstream side of the NOx catalyst. The reducing agent supply device injects the reducing agent in a flat form in a direction intersecting a center line of the NOx catalyst from a nozzle hole disposed in the casing.

12 Claims, 7 Drawing Sheets

EXHAUST GAS PURIFYING APPARATUS FOR INTERNAL COMBUSTION ENGINE

TECHNICAL FIELD

The present invention relates to an exhaust gas purifying apparatus for an internal combustion engine.

BACKGROUND ART

There is known an exhaust gas purifying apparatus, in which two particulate filters supporting NOx absorbents are disposed in parallel in an exhaust pipe, and a function regeneration process of the NOx absorbent is performed to one NOx absorbent at a time by decreasing an amount of exhaust gas flowing into the NOx absorbent (see Japanese Patent No. 2727906). There is also Japanese Utility Model Application Publication No. 7-16014 as a prior art document concerning the present invention.

In the apparatus in which occlusion-reduction type NOx catalysts (hereinafter abbreviated as NOx catalysts) which are of the NOx absorbent and the like are disposed in parallel in an exhaust passage, a distance between each NOx catalyst and each injection nozzles for supplying a reducing agent cannot sufficiently be secured, and there is a possibility that the reducing agent is supplied so as to be biased toward a part of each NOx catalyst.

DISCLOSURE OF THE INVENTION

In view of the foregoing, one object of the present invention is to provide an exhaust gas purifying apparatus for an internal combustion engine which can suppress the biased supply of the reducing agent to the occlusion-reduction type NOx catalyst to properly perform the NOx catalyst function regeneration.

To attain the above described object, according to the first aspect of the present invention, there is provided an exhaust gas purifying apparatus for an internal combustion engine, comprising: a casing which forms a part of an exhaust passage of the internal combustion engine and houses therein an occlusion-reduction type NOx catalyst; and a reducing agent supply device which supplies a reducing agent to an interior of the casing on an upstream side of the NOx catalyst, wherein the reducing agent supply device injects the reducing agent in a flat form in a direction intersecting a center line of the NOx catalyst from a nozzle hole disposed in the casing.

According to the first aspect of the exhaust gas purifying apparatus for an internal combustion engine, the reducing agent is injected in the flat form in the direction traversing the upstream end face of the NOx catalyst, so that the reducing agent can be supplied to the upstream end face of the NOx catalyst, being dispersed thereto. Therefore, the NOx catalyst function regeneration can properly be performed.

In the exhaust gas purifying device according to the first aspect of the present invention, the reducing agent may be injected in a flat form along an upstream end face of the NOx catalyst from the nozzle hole. In this case, since the reducing agent is injected in generally parallel with the upstream end face of the NOx catalyst, the reducing agent can be supplied to further be dispersed.

In the exhaust gas purifying device according to the first aspect of the present invention, the reducing agent may be injected from the nozzle hole so as to take a form in which a width in a direction extending horizontally relative to the upstream end face of the NOx catalyst is wider than a width in a direction extending perpendicular to the upstream end face of the NOx catalyst. Alternatively, the reducing agent may be injected from the nozzle hole in such a manner that the reducing agent that has reached the upstream end face of the NOx catalyst takes a form elongated in a predetermined direction on the upstream end surface and having a width narrowed in a direction perpendicular to the predetermined direction. That is, in the present invention, a concept of the flat injection includes both the case where the form of the reducing agent injected from the nozzle-hole is flat in itself and the case where the reducing agent injected from the nozzle-hole takes a flat form, such as an oval or an ellipse, which is elongated in a predetermined direction and is narrowed in width in a direction perpendicular to the predetermined direction on the upstream end face of the NOx catalyst.

In the exhaust gas purifying device according to the first aspect of the present invention, the nozzle hole may be disposed outward from an outer periphery of the NOx catalyst. To such position, the high-temperature exhaust gas discharged from the internal combustion engine is hard to flow directly, so that the nozzle-hole is hard to be exposed to the high-temperature exhaust gas. Therefore, heat transfer from the exhaust gas to the reducing agent supply device can be suppressed to thereby suppress an increase in temperature of the reducing agent supply device.

The exhaust gas purifying apparatus according to the first aspect may comprise an exhaust gas introduction portion which is provided on an upstream side of the casing and is inclined relative to an upstream end face of the NOx catalyst in such a manner that the exhaust gas is introduced obliquely to the upstream end face, and the reducing agent supply device may inject the reducing agent generally parallel to the exhaust gas flowing into the NOx catalyst and in the same direction as that of the flow of the exhaust gas. The form of the reducing agent injected from the nozzle-hole (hereinafter abbreviated as a spray form) is deformed by affecting an influence of an exhaust gas flow. In the case where the exhaust gas flows obliquely into the upstream end face of the NOx catalyst, the reducing agent is injected in generally parallel with the exhaust gas and in the same direction as that of the flow of the exhaust gas, so that the influence of the exhaust gas flow on the spray form can be suppressed. Therefore, the reducing agent can be supplied from the further upstream side of the exhaust gas flow, and the reducing agent can be supplied, being further dispersed in the NOx catalyst.

The exhaust gas purifying apparatus according to the first aspect may comprise: an exhaust gas control valve switchable between a position at which the flow of the exhaust gas into the NOx catalyst is allowed and a position at which the flow of the exhaust gas is inhibited; and an operation control device which controls an operation of the exhaust gas control valve, and the operation control device may switch the exhaust control valve to the position at which the flow of the exhaust gas into the NOx catalyst is inhibited at a time of rich spike in which an air-fuel ratio of the exhaust gas is temporally set to a rich side and thereafter may control an operation of the reducing agent supply device in such a manner that the reducing agent is added to the exhaust passage after space velocity in the NOx catalyst begins to decrease. The slower becomes flow rate of the exhaust gas, the less influence has the exhaust gas flow on the spray form of the reducing agent. Thus, by supplying the reducing agent after the space velocity in the NOx catalyst begins to decrease, i.e., after velocity of the exhaust gas flowing into the NOx catalyst begins to decrease, it is possible to suppress the influence of the exhaust gas flow on the reducing agent spray form. Therefore, the reducing agent spray form is stabilized, and the reducing agent can be supplied, being further dispersed in the NOx catalyst.

The space velocity according to the present invention is given as a ratio of a gas volume per one hour flowing into the catalyst to a catalyst capacity.

To attain the above described object, according to the second aspect of the present invention, there is provided an exhaust gas purifying apparatus for an internal combustion engine, comprising: an exhaust pipe which forms a part of an exhaust passage of the internal combustion engine and has a plurality of branch pipes branching off from the same upstream pipe; a plurality of casings, each of which is provided in each branch pipe and houses therein an occlusion-reduction type NOx catalyst; and a plurality of reducing agent supply devices, each of which is provided on each casing and supplies a reducing agent to an interior of the casing on an upstream side of the NOx catalyst, wherein each reducing agent supply device injects the reducing agent in a flat form in a direction intersecting a center line of the NOx catalyst from a nozzle hole disposed in each casing.

According to the second aspect of the exhaust gas purifying apparatus for an internal combustion engine, similarly to the first aspect of the exhaust gas purifying apparatus, the reducing agent can be supplied from each reducing agent supply device to the NOx catalyst, being dispersed in the NOx catalyst.

In the exhaust gas purifying device according to the second aspect, the reducing agent may be injected in a flat form along an upstream end face of the NOx catalyst from the nozzle hole. By making the reducing agent be injected in generally parallel to the upstream end face of the NOx catalyst, it is possible to supply the reducing agent to the NOx catalyst so as to further be dispersed in the NOx catalyst.

To inject the reducing agent in such a flat form, the reducing agent may be injected from the nozzle hole so as to take a form in which a width in a direction extending horizontally relative to the upstream end face of the NOx catalyst is wider than a width in a direction extending perpendicular to the upstream end face of the NOx catalyst, or the reducing agent may be injected from the nozzle hole in such a manner that the reducing agent, which has reached the upstream end face of the NOx catalyst, takes a form elongated in a predetermined direction on the upstream end surface and narrowed in a width in a direction perpendicular to the predetermined direction.

In the exhaust gas purifying device according to the second aspect, the nozzle hole may be disposed outward from an outer periphery of the NOx catalyst. By disposing the nozzle-hole at such a position, it is possible to suppress the increase in temperature of each of the reducing agent supply devices.

In the exhaust gas purifying device according to the second aspect, an exhaust gas introduction portion which is inclined relative to an upstream end face of the NOx catalyst may be provided on an upstream side in such a manner that the exhaust gas is introduced obliquely to the upstream end face, and each reducing agent supply device may inject the reducing agent generally parallel to the exhaust gas flowing into the NOx catalyst and in the same direction as that of the flow of the exhaust gas. In the case where the exhaust gas flows obliquely into the upstream end face of each NOx catalyst, it is possible to suppress the influence of the exhaust gas flow on the spray form by making the reducing agent be injected in generally parallel to the exhaust gas and in the same direction as that of the exhaust gas flow. Therefore, the reducing agent can be supplied from the further upstream side of the exhaust gas flow, and the reducing agent can be supplied, being further dispersed in the NOx catalyst.

The exhaust gas purifying apparatus according to the second aspect may comprise: a plurality of exhaust gas control valves, each of which is switchable between a position at which the flow of the exhaust gas into the NOx catalyst is allowed and a position at which the flow of the exhaust gas is inhibited; and an operation control device which controls operation of the exhaust gas control valves, and the operation control device may switch each of the exhaust control valves to the position at which the flow of the exhaust gas into the NOx catalyst is inhibited at a time of rich spike in which an air-fuel ratio of the exhaust gas is temporally set to a rich side to reduce an NOx occluded in the NOx catalyst and thereafter controls operation of each of the reducing agent supply devices in such a manner that the reducing agent is added to the NOx catalyst after space velocity in the NOx catalyst begins to decrease. By adding the reducing agent at such a time, it is possible to suppress the influence of the exhaust gas flow on the reducing agent spray form and to stabilize the reducing agent spray form, thereby allowing the reducing agent to be supplied so as to further be dispersed in the NOx catalyst.

In the present invention, any occlusion-reduction type NOx catalyst may be used as long as NOx can be held by the catalyst, and whether NOx is held in the mode of either absorption or adsorption is not restricted by the term of occlusion. The later-described SOx poisoning is not restricted by the mode, and emission of NOx or SOx is not restricted by the mode.

As described above, according to the present invention, the reducing agent is injected to take a flat form in the direction intersecting the center line of the NOx catalyst, so that the reducing agent can be supplied to the NOx catalyst and be dispersed in the NOx catalyst. In the case where the exhaust gas flows obliquely into the upstream end face of the NOx catalyst, the reducing agent is injected in generally parallel to the oblique flow exhaust gas and in the same direction as that of the exhaust gas flow, thereby allowing the reducing agent to be supplied to the NOx catalyst while further dispersed. Therefore, the NOx catalyst function regeneration can properly be performed.

BRIEF DESCRIPTION OF THE DRAWINGS

FIGS. 3A and 3B are enlarged views showing a part of the exhaust pipe of FIG. 2, wherein FIG. 3A is a view showing a spray form of a reducing agent injected from an addition injector when viewed from an upstream side of a fore-catalyst, and FIG. 3B is an enlarged view showing a part of each branch pipe;

FIGS. 7A and 7B are views showing another example of the reducing agent spray form in the exhaust gas purifying apparatus according to the present invention, wherein FIG. 7A shows the spray form when viewed from a lower side of FIG. 7B, and FIG. 7B shows the spray form when viewed from the upstream side of the fore-catalyst.

BEST MODE FOR CARRYING OUT THE INVENTION

Figure 1:
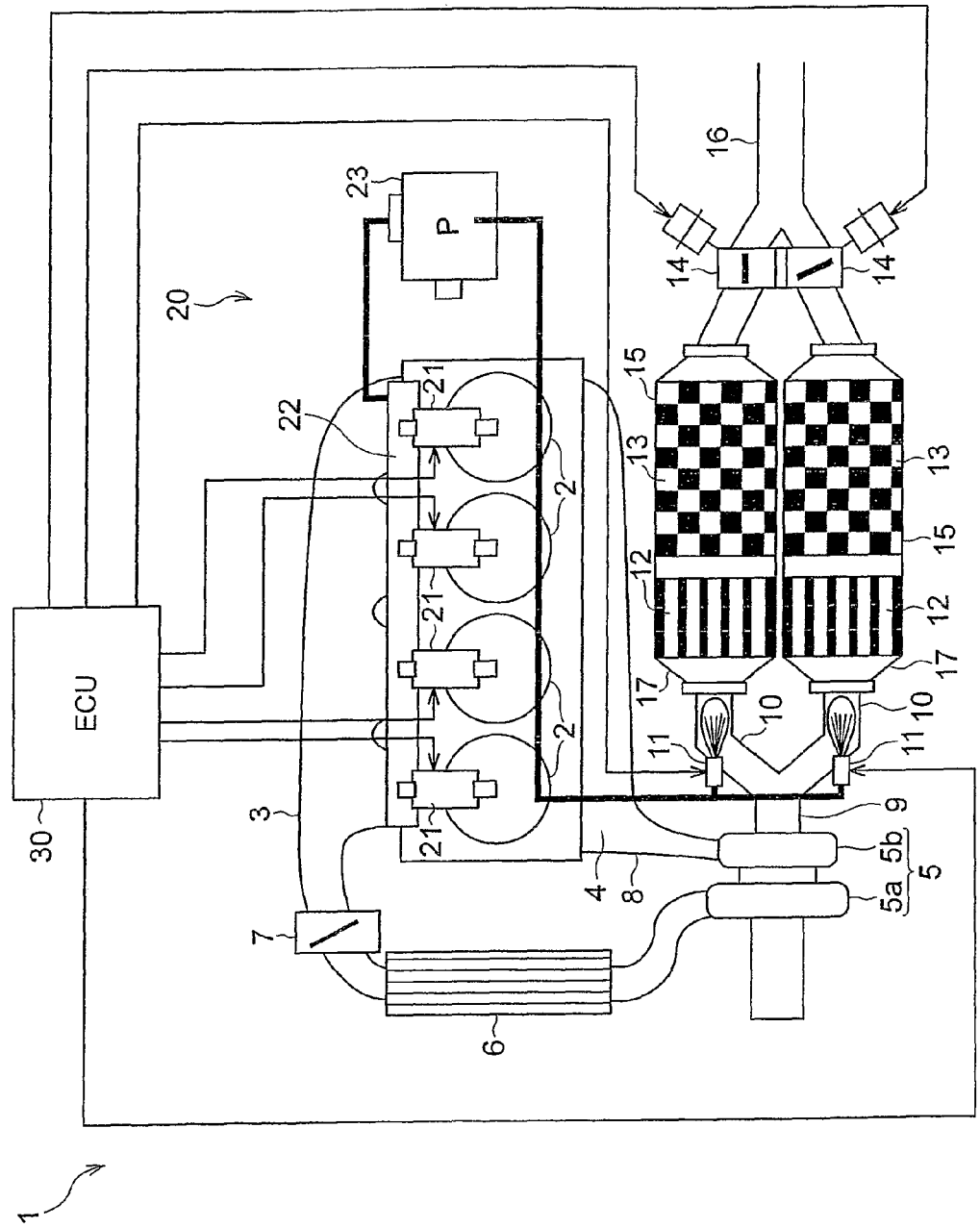
FIG. 1 is a view showing a configuration of an embodiment in which an exhaust gas purifying apparatus according to the present invention is incorporated into a diesel engine.

FIG. 1 shows a configuration of one embodiment in which an exhaust gas purifying apparatus according to the present invention is incorporated into a diesel engine (hereinafter, may be abbreviated as engine) 1 which is of an internal combustion engine. The engine 1 is mounted on a vehicle as a power source, and to cylinders 2 of the engine 1 are connected an intake passage 3 and an exhaust passage 4. In the intake passage 3, there are provided a compressor 5a of a turbocharger 5, an inter cooler 6 for cooling intake air, and a throttle valve 7 for adjusting an amount of the intake air, while in the exhaust passage 4, there is provided a turbine 5b of the turbocharger 5. The exhaust passage 4 is formed by an exhaust pipe 8. The exhaust pipe 8 has branch pipes 10 (two branch pipes in FIG. 1) branching off from the same upstream pipe 9 on the downstream side of the turbine 5b. In each of the branch pipes 10, there are provided, in the order from upstream side, an addition injector 11 which has a slit-shaped nozzle-hole 11a and which is of the reducing agent supply device or means, a fore-catalyst 12, a particulate filter (hereinafter abbreviated as a filter) 13 which supports the occlusion-reduction type NOx catalyst, and an exhaust gas control valve 14 capable of being switched between a position at which the flow of the exhaust gas into the branch pipe 10 is allowed and a position at which the flow of the exhaust gas into the branch pipe 10 is inhibited. Each of the fore-catalyst 12 and the filter 13 is housed in a casing 15 constituting a part of the branch pipe 10. That is, the engine 1 of FIG. 1, the plural fore-catalysts 12 and filters 13 are included in parallel in the exhaust passage 4. Each branch pipe 10 is connected to a common downstream pipe 16 on the downstream side of the exhaust gas control valve 14. As the fore-catalyst 12, for example, there is provided the NOx occlusion-reduction type exhaust gas purifying catalyst in which NOx in the exhaust gas is occluded in an oxygen-excessive lean atmosphere, and NOx is reduced and purified while the occluded NOx is emitted in a stoichiometric air-fuel ratio or an oxygen-short rich atmosphere. Accordingly, both the fore-catalyst 12 and the filter 13 correspond to the occlusion-reduction type NOx catalyst according to the present invention. The fuel (gas oil) of the engine 1 is used as the reducing agent.

As described above, the occlusion-reduction type NOx catalyst has the characteristic such that, when the air-fuel ratio of the exhaust gas is lean, the occlusion-reduction type NOx catalyst occludes NOx, and when the air-fuel ratio of the exhaust gas is stoichiometric or rich, the occlusion-reduction type NOx catalyst emits NOx to reduce NOx into nitrogen ($N_2$). Because there is an upper limit of the NOx amount which can be occluded by the Nox catalyst, NOx reduction in which NOx is emitted from the NOx catalyst to reduce NOx into $N_2$ is to be performed at predetermined intervals such that the occluded NOx amount does not reach the upper limit, thereby maintaining the exhaust gas purifying performance of the NOx catalyst at a high level. The NOx catalyst may be poisoned by sulfur oxides (SOx) included in the exhaust gas. Therefore, an S regeneration in which the NOx catalyst function is regenerated is to be performed. In the S regeneration, while the temperature of the NOx catalyst is raised to a temperature range in which sulfur (S) is emitted from the NOx catalyst, the air-fuel ratio of the exhaust gas is set in the stoichiometric air-fuel ratio or a rich air-fuel ratio to recovery from the sulfur poisoning. The addition injector 11 performs rich spike to generate a reducing atmosphere necessary in performing the NOx reduction and the S regeneration. In the rich spike, the exhaust gas air-fuel ratio is temporarily changed to the stoichiometric air-fuel ratio or the rich side by adding the reducing agent to the interior of the casing 15. Hereinafter, the NOx reduction and the S regeneration may collectively be referred to as function regeneration process.

Figure 2:
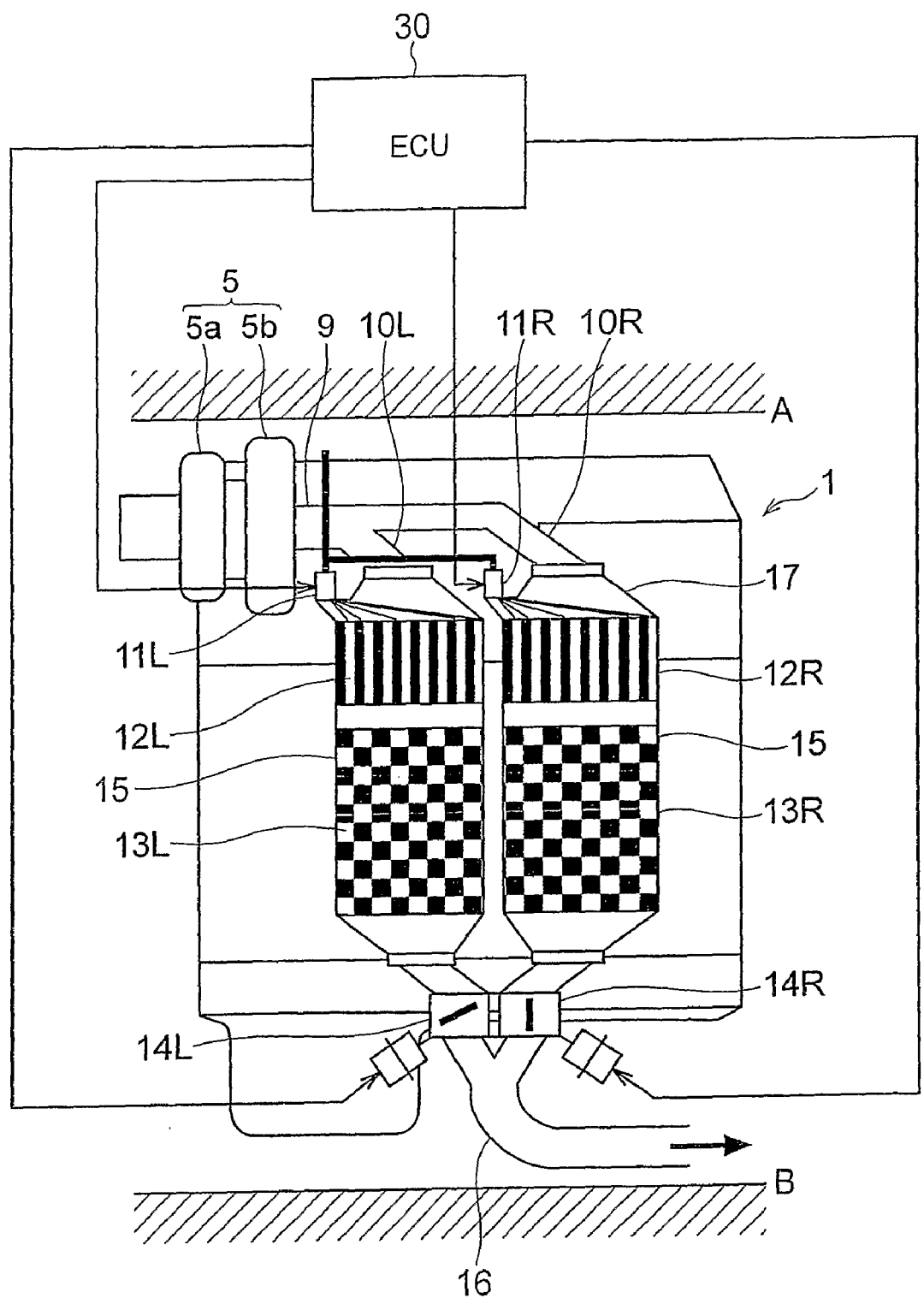
FIG. 2 is a view showing a state of an exhaust pipe of the engine of FIG. 1 mounted on a vehicle.
Figure 3A:
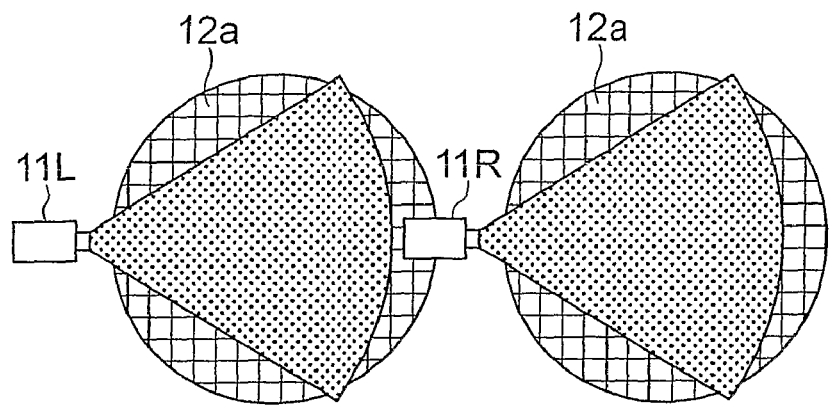
Figure 3B:
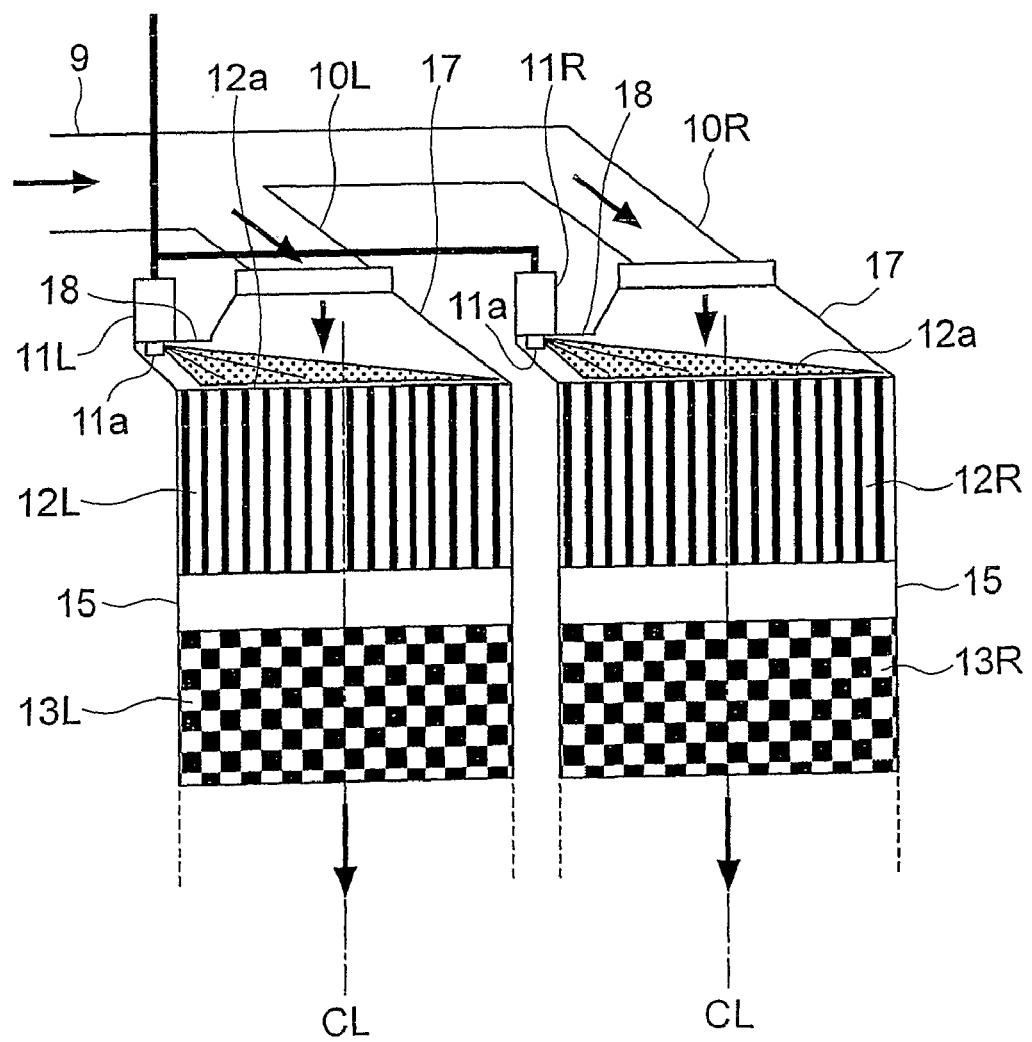

FIG. 2 shows a state of the exhaust pipe 8 of the engine 1 mounted on a vehicle, and FIG. 3B is an enlarged view showing a part of the exhaust pipe 8 of FIG. 2. FIG. 3A is a view showing the spray form of the reducing agent injected from each addition injector 11 when viewed from the upstream side of each fore-catalyst 12, and FIG. 3B is an enlarged view showing a part of each branch pipe 10. A line A on the upper side of FIG. 2 indicates an engine hood of the vehicle, and a line B on the lower side indicates a minimum ground clearance. As shown in FIG. 2, each branch pipe 10 is disposed such that the upstream side is orientated upward in the vertical direction and the downstream side is orientated downward in the vertical direction. Therefore, as shown by an arrow in FIG. 3B, the exhaust gas discharged from the turbine 5b flows into each fore-catalyst 12 from the upper portion in the vertical direction. On the upstream side of each casing 15, there is provided a cone portion 17 which is of the exhaust gas introduction portion and which is gradually widened along the exhaust gas flow, and in each cone portion 17, there is provided a projection portion 18 which is projected outward from outer peripheries of the fore-catalyst 12 and filter 13. As shown in the enlarged view of FIG. 3B, since each addition injector 11 is disposed on the projection portion 18, the nozzle-hole 11a of each addition injector 11 is disposed outward from an outer periphery of each fore-catalyst 12.

Figure 4:
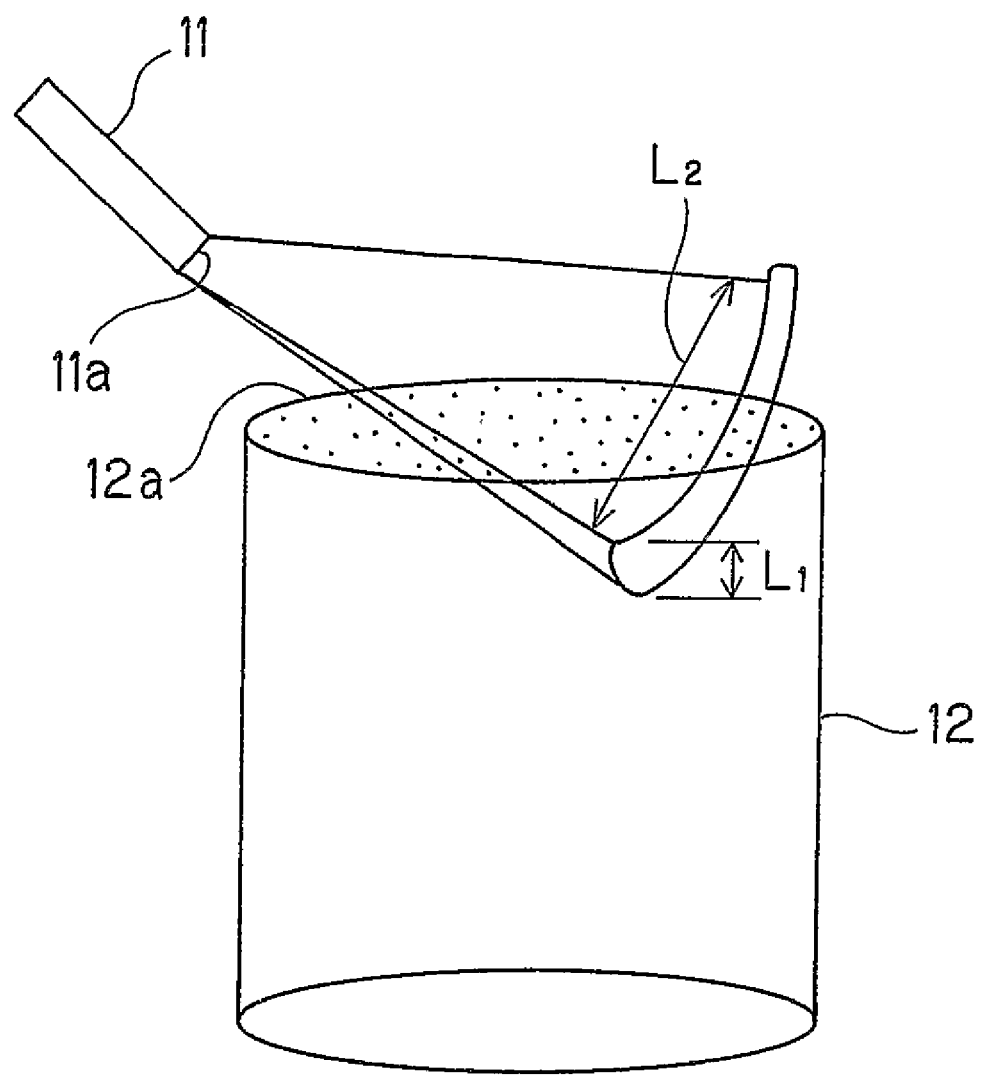
FIG. 4 is an enlarged view showing the spray form of the reducing agent injected from a nozzle-hole.

As shown in FIG. 3B, the reducing agent is injected from the nozzle-hole 11a of each addition injector 11 to the interior of each casing 15 on the upstream side of each fore-catalyst 12 in such a manner that the reducing agent is injected from the side portion of each fore-catalyst 12 in a direction intersecting a center line CL of each fore-catalyst 12, and that the reducing agent is also injected to take a flat form along the upstream end face 12a of each fore-catalyst 12. In other words, the reducing agent is injected in the flat form from the nozzle-hole 11a in generally parallel to the upstream end face 12a of each fore-catalyst 12. The reducing agent may be injected to take a flat form in a direction perpendicular to the exhaust gas flow. As shown in FIG. 3A, the reducing agent is injected from each nozzle-hole 11a such that the injected reducing agent spreads from the center of the nozzle-hole 11a toward the direction traversing the exhaust gas flow. FIG. 4 is an enlarged view showing the spray form of the reducing agent injected from the nozzle-hole 11a. As shown in FIG. 4, the reducing agent is injected from the nozzle-hole 11a so as to take the form in which a width L2 in a direction extending horizontally relative to the upstream end face 12a of the fore-catalyst 12 is wider than a width L1 in a direction extending perpendicular to the upstream end face 12a.

Returning to FIG. 1, the description will be continued. The engine 1 includes a fuel supply apparatus 20. The fuel supply apparatus 20 includes fuel injection valves 21 which inject the fuel into the cylinders 2, a common rail 22 in which the high-pressure fuel to be injected from the fuel injection valves 21 is accumulated, and a fuel pump 23 which supplies the fuel from a fuel tank (not shown) to the common rail 22. As shown in FIG. 1, each addition injector 11 is connected to the fuel pump 23, and the fuel of the engine 1 is injected as the reducing agent from each addition injector 11.

The operations of the addition injectors 11 and exhaust gas control valves 14 are controlled by an engine control unit (ECU) 30. The ECU 30 is a known computer unit which controls an operation state of the engine 1, e.g., by controlling the operations of the fuel injection valves 21 to adjust an amount of fuel to be injected into each cylinder 2. The ECU 30 also controls the operation of each exhaust gas control valve 14 such that the exhaust gas discharged from the turbine 5b when in the operation of the engine 1 is introduced to one of the two branch pipes 10 provided in parallel. As described above, in order to maintain the exhaust gas purifying performance of the NOx catalyst at the high level, it is necessary that the function regeneration process be performed at predetermined intervals. In performing the function regeneration process, the operations of the exhaust gas control valves 14 are controlled such that the branch pipe 10 to which the exhaust gas is to be introduced is switched from one branch pipe 10 to which the exhaust gas has been introduced to the other branch pipe 10. Thus, the ECU 30 serves as the operation control device or means according to the present invention by controlling the operation of each exhaust gas control valve 14.

The exhaust gas flow when in the operation of the engine 1 will be described with reference to FIGS. 2 and 3B. The branch pipe 10 on the left side of FIGS. 2 and 3B is referred to as branch pipe 10L, and the branch pipe 10 on the right side is referred to as branch pipe 10R. The components provided in the branch pipe 10L are referred to as an addition injector 11L, a fore-catalyst 12L, a filter 13L, and an exhaust gas control valve 14L, while the components provided in the branch pipe 10R are referred to as an addition injector 11R, a fore-catalyst 12R, a filter 13R, and an exhaust gas control valve 14R. For example, when in the operation of the engine 1, the ECU 30 opens the exhaust gas control valve 14R to allow the exhaust gas to flow into the branch pipe 10R, while closes the exhaust gas control valve 14L to inhibit the exhaust gas from flowing into the branch pipe 10L. Thus, the exhaust gas is introduced to the branch pipe 10R to be purified in the fore-catalyst 12R and the filter 13R by controlling the operations of the exhaust gas control valves 14. In the case where the function regeneration process of the NOx catalyst supported by the fore-catalyst 12R and the filter 13R is to be performed, the ECU 30 closes the exhaust gas control valve 14R to inhibit the exhaust gas from flowing into the branch pipe 10R, while opens the exhaust gas control valve 14L to allow the exhaust gas to flow into the branch pipe 10L. Thus, the exhaust gas is introduced to the branch pipe 10L by controlling the operations of the exhaust gas control valves 14. Then, the reducing agent is injected from the addition injector 11R to perform the function regeneration process of the NOx catalyst. The switch of the exhaust gas flow from the branch pipe 10L to the branch pipe 10R is performed when performing the function regeneration process of the NOx catalysts supported by the fore-catalyst 12L and filter 13L. Thus, the ECU 30 controls the operations of the exhaust gas control valves 14 such that the exhaust gas flows alternately into the branch pipes 10.

Figure 5:
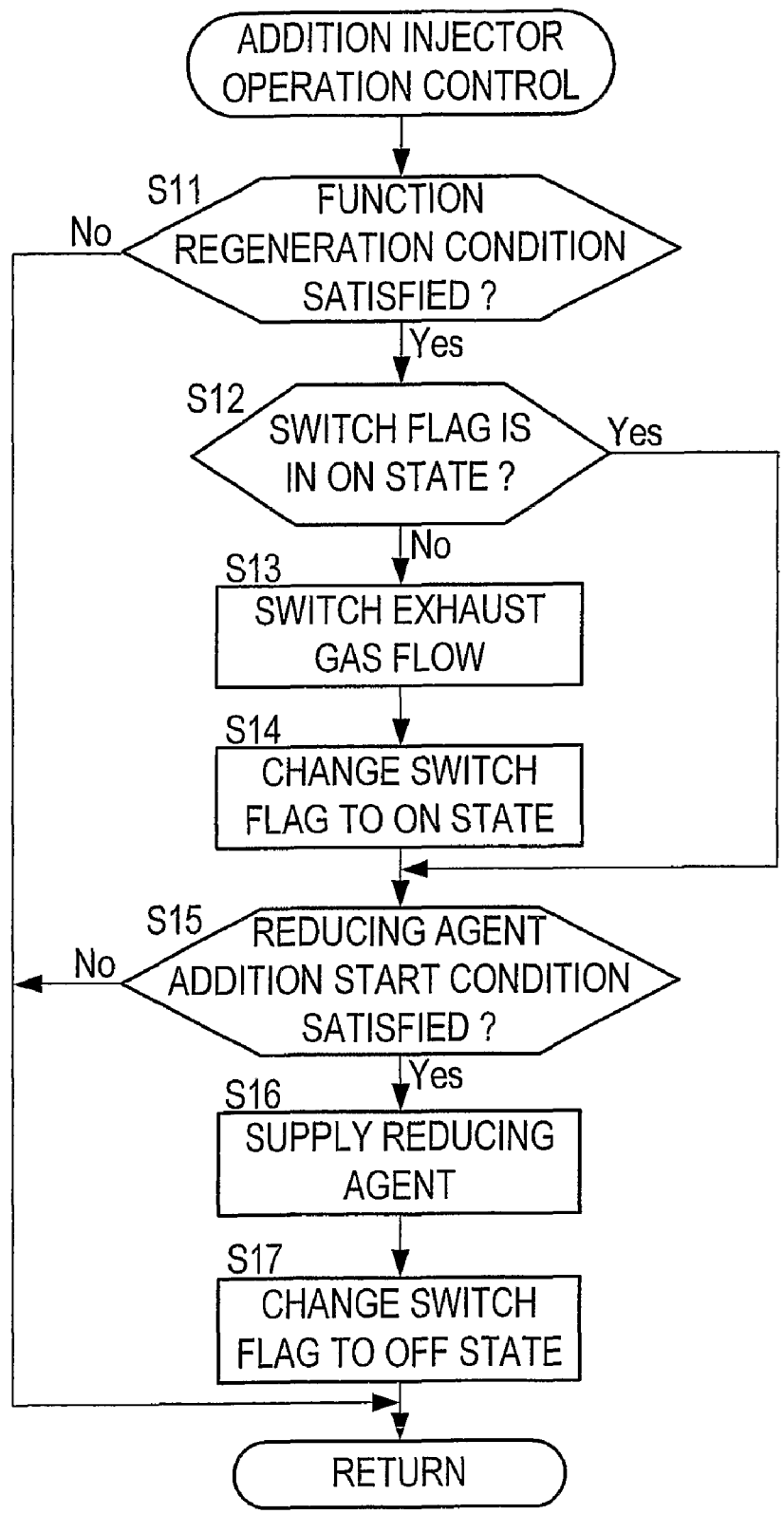
FIG. 5 is a flowchart showing an addition injector operation control routine performed by an ECU.

FIG. 5 is a flowchart showing an addition injector operation control routine which is performed by the ECU 30 in order to control the operations of the addition injectors 11. The control routine of FIG. 5 is repeatedly performed at predetermined periods during the operation of the engine 1.

Referring to the control routine of FIG. 5, in Step S11, the ECU 30 determines whether a function regeneration condition is satisfied or not. The function regeneration condition is set in order to perform the function regeneration process in which the rich spike is performed to the NOx catalyst of the branch pipe 10 to which the exhaust gas is introduced. Whether the function regeneration condition is satisfied is determined, for example, based on an integrated value of the amount of exhaust gas discharged from the engine 1, and when the integrated value of the amount of exhaust gas introduced to one of the branch pipes 10 exceeds a predetermined criterion, the ECU 30 determines that the function regeneration condition is satisfied. When the ECU 30 determines that the function regeneration condition is not satisfied, the current control routine is ended. On the other hand, when the ECU 30 determines that the function regeneration condition is satisfied, the ECU 30 goes to Step S12, and the ECU 30 determines whether a switch flag for indicating that the exhaust gas flow is switched from one of branch pipes 10 to the other branch pipe 10 is in an ON state or not. When the ECU 30 determines that the switch flag is in the ON state, the ECU 30 skips the processes in Steps S13 and S14 and then goes to Step S15. On the other hand, when the ECU 30 determines that the switch flag is in the OFF state, the ECU 30 goes to Step S13 and controls the operations of the exhaust gas control valves 14 to switch the exhaust gas flow from one of branch pipes 10 to the other branch pipe 10. For example, in the case where the function regeneration process of the NOx catalysts in the fore-catalyst 12R and filter 13R of FIG. 2 is to be performed, the ECU 30 controls the operations of the exhaust gas control valves 14 such that the exhaust gas flow is switched from the branch pipe 10R to the branch pipe 10L. In Step S14, the ECU 30 switches the switch flag to the ON state, and then goes to Step S15.

In Step S15, the ECU 30 determines whether the time to start the injection of the reducing agent comes or not. Whether the time to start the injection of the reducing agent comes is determined, for example, based on whether a predetermined time elapses or not since the switch flag is switched to the ON state. When the predetermined time has elapsed, the ECU 30 determines that the time to start the addition of the reducing agent has come. For example, as the predetermined time, there is set a time during which the exhaust gas flowing into the branch pipe 10, to which the function regeneration process of the NOx catalyst is to be performed by closing the exhaust gas control valve 14, is throttled and thus space velocity in the fore-catalyst 12 and filter 13 begins to decrease. When the ECU 30 determines that the time to start the injection of the reducing agent has not come, the current control routine is ended. On the other hand, when the ECU 30 determines that the time to start the injection of the reducing agent has come, the ECU 30 goes to Step S16, and then controls the operation of the addition injector 11 on the side where the function regeneration process of the NOx catalyst is to be performed, thereby making the reducing agent be supplied to the NOx catalyst. In Step S17, the ECU 30 switches the switch flag to the OFF state. Then, the current control routine is ended.

In this embodiment, as shown in FIGS. 3A and 3B, the reducing agent is injected in the flat form in the direction intersecting the center line CL of each fore-catalyst 12 from the addition injector 11 located in the side portion of each fore-catalyst 12, so that the reducing agent can be supplied to each fore-catalyst 12 and each filter 13, being dispersed thereto. Therefore, the function regeneration process of the NOx catalyst can properly be performed to maintain the exhaust gas purifying performance of each fore-catalyst 12 and each filter 13 at a high level. As shown in FIG. 3B, the nozzle-hole 11a of each addition injector 11 is disposed outward from the outer periphery of each fore-catalyst 12, i.e., each nozzle-hole 11a is disposed in the dead area relative to the exhaust gas flow, so that the exhaust gas discharged from the turbine 5b hardly strikes on each nozzle-hole 11a. Therefore, the heat transfer from the exhaust gas to each addition injector 11 is suppressed to thereby suppress the temperature rise in each addition injector 11, allowing reliability of the addition injector 11 to be increased. The injection of the reducing agent is performed after the exhaust gas flowing into the branch pipe 10 is throttled by the exhaust gas control valve 14 and thus the space velocity in the fore-catalyst 12 and filter 13 begins to decrease. Therefore, the influence of the exhaust gas flow on the reducing agent spray form is suppressed to thereby stabilize the reducing agent spray form, and the reducing agent can be supplied to the upstream end face 12a of the fore-catalyst 12, being further dispersed. Since the addition injector 11 is provided on the cone portion 17 of each casing 15, the compact disposition of each addition injector 11 can be performed in the exhaust passage 4.

The manner of controlling the operation of each exhaust gas control valve 14, performed by the ECU 30, may be appropriately changed according to the capacities of the fore-catalyst 12 and filter 13 disposed in each branch pipe 10. For example, in the case where the exhaust gas of the engine 1 can properly be purified by the fore-catalyst 12 and the filter 13 disposed in one of the branch pipes 10, the operation of each exhaust gas control valve 14 may be controlled by the above-described operation control manner. On the other hand, in the case where the capacities of the fore-catalyst 12 and the filter 13 which can be disposed in one of the branch pipes 10 is restricted according to a vehicle size or the like, the operation of each exhaust gas control valve 14 may be controlled by, for example, the following control manner.

In the normal operation of the engine 1, the ECU 30 maintains both the exhaust gas control valves 14 in the opened state to make the exhaust gas flow into both the branch pipes 10, and the ECU 30 makes the exhaust gas be purified in the fore-catalysts 12 and the filters 13 disposed in both the branch pipes 10. For example, in the exhaust pipe 8 of FIG. 8, the exhaust gas control valves 14L and 14R are maintained in the opened state, and the exhaust gas is allowed to flow into the branch pipes 10L and 10R to be purified by the fore-catalysts 12L and 12R and the filters 13L and 13R. On the other hand, in performing the function regeneration process of the NOx catalyst, the ECU 30 switches one of the exhaust gas control valves 14, which is disposed on the side of the fore-catalyst 12 and filter 13 to which the function regeneration process is to be performed, to the closed state, and then, the ECU 30 makes the reducing agent be supplied to the fore-catalyst 12 and filter 13 after the space velocity in the fore-catalyst 12 and filter 13 begins to decrease. For example, in the case where the function regeneration process of the fore-catalyst 12L and filter 13L is to be performed in the exhaust pipe 8 of FIG. 2, the ECU 30 switches only the exhaust gas control valve 14L to the closed state, and then the ECU 30 controls the operation of the addition injector 10L to supply the reducing agent to the fore-catalyst 12L and filter 13L.

Thus, in the case where the capacities of the fore-catalyst 12 and the filter 13 which can be disposed in each branch pipe 10 are restricted, the exhaust gas is allowed to flow into both the branch pipes 10 in the normal operation, making the exhaust gas be properly purified with the fore-catalyst 12 and the filter 13 which are disposed in each branch pipe 10. On the other hand, in the function regeneration process of the fore-catalyst 12 and filter 13, only the exhaust gas control valve 14 which is disposed on the side of the fore-catalyst 12 and filter 13 to which the function regeneration process is to be performed is switched to the closed state, and then, the reducing agent is supplied after the space velocity in the fore-catalyst 12 and filter 13 begins to decrease. Therefore, the function regeneration process can adequately be performed.

Figure 6A:
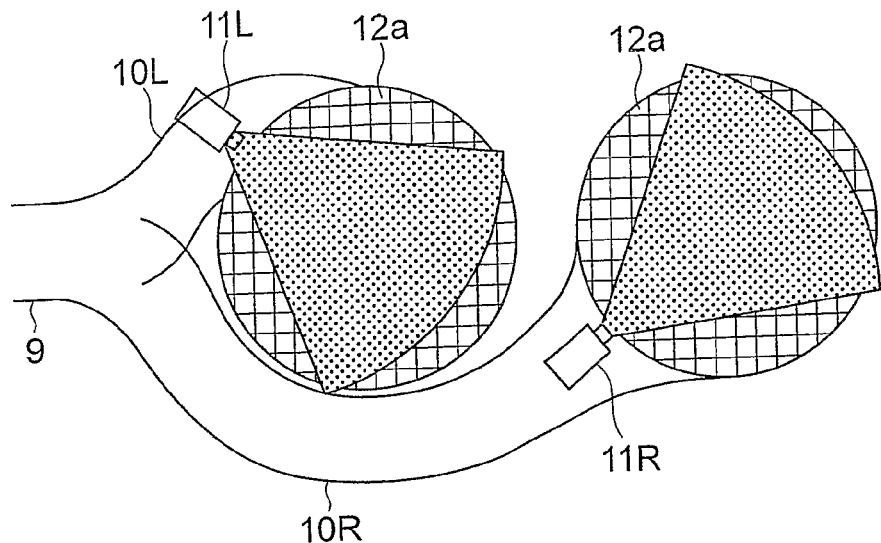
FIGS. 6A and 6B are views showing another embodiment of the exhaust gas purifying apparatus according to the present invention.
Figure 6B:
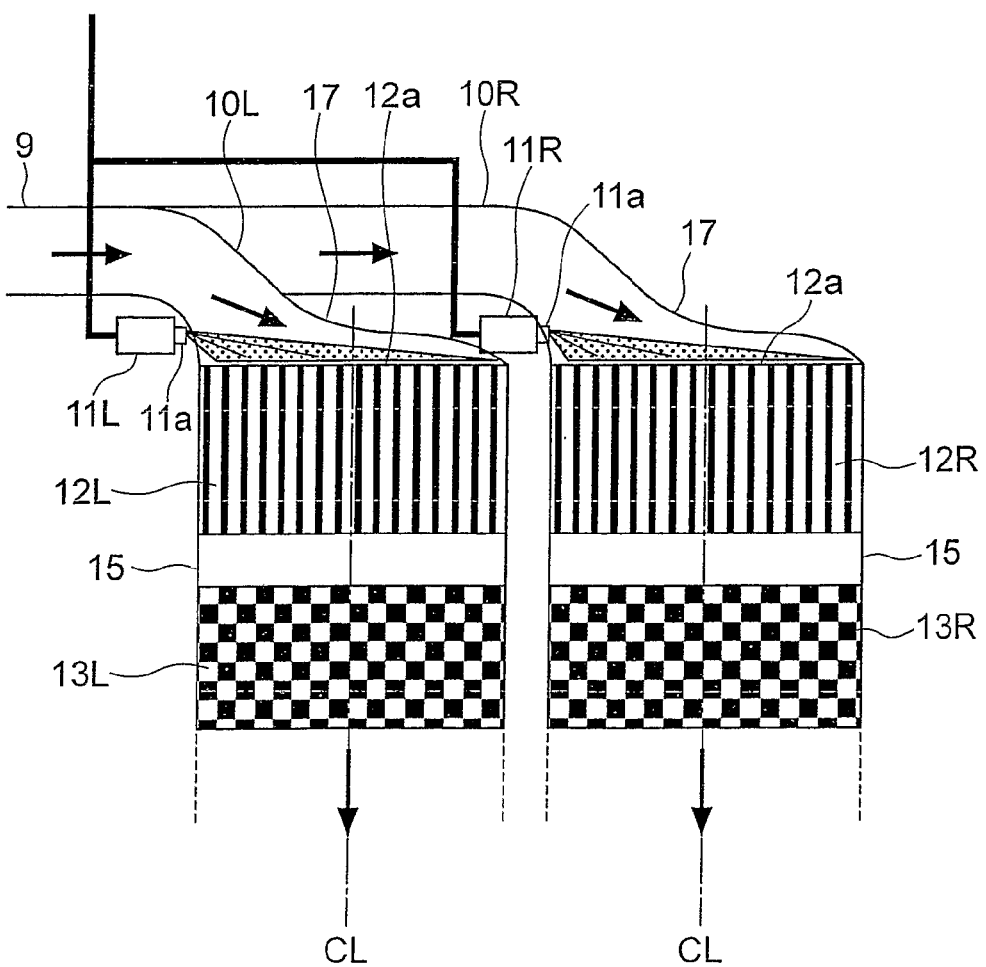

FIGS. 6A and 6B show another embodiment of the exhaust gas purifying apparatus according to the present invention. FIG. 6A is a view showing the spray form of the reducing agent injected from each addition injector 11 when viewed from the upstream side of each fore-catalyst 12, and FIG. 6B is an enlarged view showing a part of each branch pipe 10. In FIGS. 6A and 6B, the common component with that of FIGS. 3A and 3B is designated by the same reference numeral, and the description thereof will be omitted. As shown in FIG. 6B, in this embodiment, each cone portion 17 is provided in an inclined manner relative to the upstream end face 12a such that the exhaust gas flows into the upstream end face 12a of each fore-catalyst 12 from the obliquely upper direction. As shown in FIG. 6B, each addition injector 11 is disposed in the place located outward from the outer periphery of each fore-catalyst 12 in the obliquely provided cone portion 17, and the reducing agent is injected from each nozzle-hole 11a in the generally parallel to the exhaust gas flow flowing into each fore-catalyst 12 and in the same direction as the exhaust gas flow.

According to this embodiment, the exhaust gas flow from the obliquely upper direction to each fore-catalyst 12 enables the exhaust gas flow biased toward the upstream end face 12a of each fore-catalyst 12 to be suppressed with a height of each cone portion 17 being decreased. Since each addition injector 11 injects the exhaust gas in parallel to the exhaust gas flow flowing obliquely into the upstream end face 12a and in the same direction as the exhaust gas flow direction, the influence of the exhaust gas flow on the reducing agent spray form can be suppressed. Therefore, the reducing agent can be supplied from the further upstream side of the exhaust gas flow, so that the reducing agent can be supplied to the upstream end face 12a so as to further be dispersed. Since each addition injector 11 is provided to be disposed outward from the outer periphery of each fore-catalyst 12, the heat transfer from the exhaust gas to each addition injector 11 can be suppressed to thereby suppress the temperature rise in each addition injector 11. Therefore, the reliability of the addition injectors 11 can be improved.

The present invention can be realized in various embodiments without limiting to the above embodiments. For example, the present invention is not limited to the application to the diesel engine, but the present invention may be applied to various internal combustion engines in which gasoline or another kind of fuel is utilized.

Figure 7A:
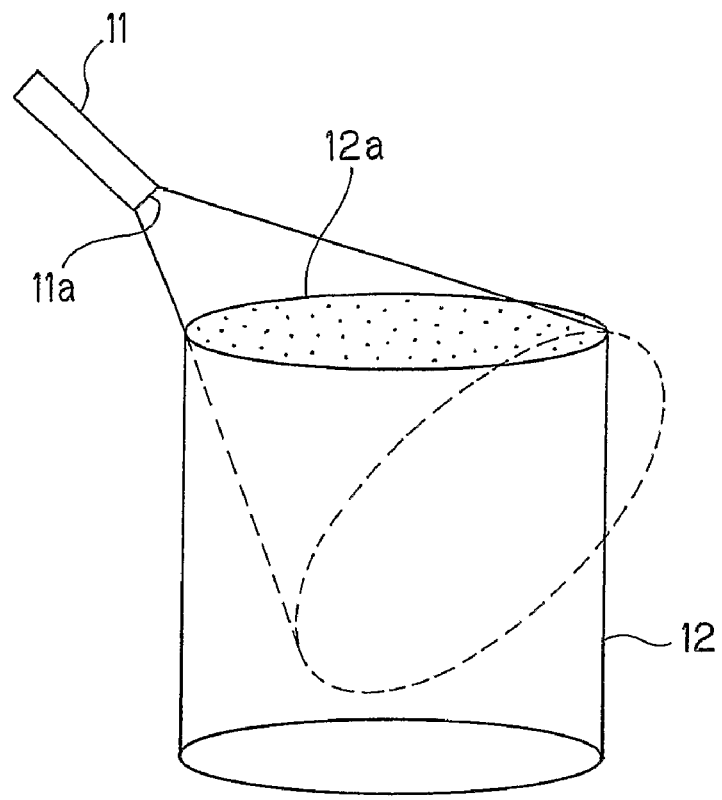
Figure 7B:
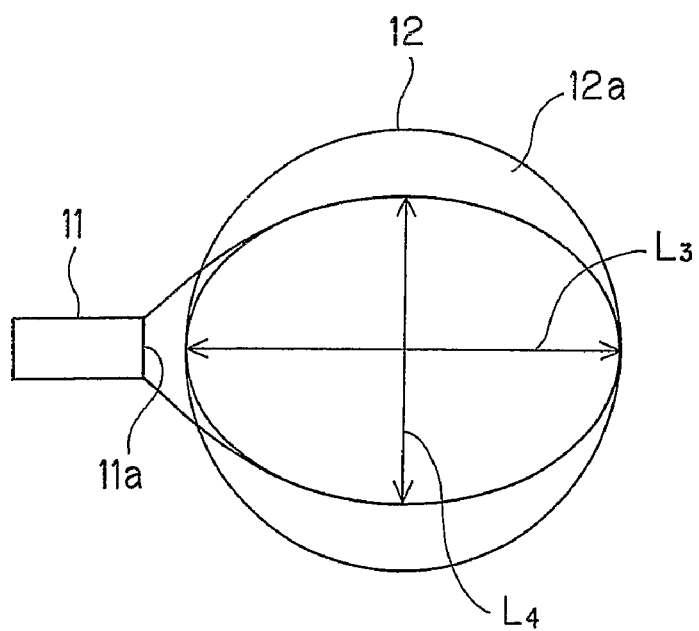

The shape of the nozzle-hole of the addition injector used in the exhaust gas purifying apparatus according to the present invention is not limited to the slit shape, and the spray form is also not limited to the above-described form. For example, the addition injector 11 may have the nozzle-hole 11a which has the shape such that the spray form is configured in a generally conical form as shown in FIG. 7A. In this case, as shown in FIG. 7A, the nozzle-hole 11a is disposed at a distance, in which the reducing agent spray form is maintained in the generally conical shape, from the upstream end face 12a of the fore-catalyst 12, and the nozzle-hole 11a is disposed such that the reducing agent injected from the nozzle-hole 11a is sprayed to the upstream end face 12a in the flat form when the reducing agent has intersected the upstream end face 12a. FIG. 7B shows the reducing agent spray form of FIG. 7A when viewed from the upstream side of the fore-catalyst 12. As shown in FIG. 7B, on the upstream end face 12a, the reducing agent takes a form which is elongated in a predetermined direction and is narrowed in a width in the direction perpendicular to the predetermined direction. That is, the reducing agent takes a form of the flat oval shape which is elongated in the reducing agent injection direction shown by an arrow L3 in FIG. 7B and is narrowed in the width in the direction perpendicular to the injection direction. Thus, the reducing agent flat injection according to the present invention includes the case in which the reducing agent takes a flat form on the upstream end face 12a of the fore-catalyst 12.

The invention claimed is:

1. An exhaust gas purifying apparatus for an internal combustion engine, comprising:
    a casing which forms a part of an exhaust passage of the internal combustion engine and houses therein an occlusion-reduction type NOx catalyst; and
    a reducing agent supply device which supplies a reducing agent to an interior of the casing on an upstream side of the NOx catalyst, wherein
    the reducing agent supply device injects the reducing agent in a flat form in a direction intersecting a center line of the NOx catalyst from a nozzle hole disposed in the casing, and
    the reducing agent is injected from the nozzle hole so as to take a form in which a width in a direction extending horizontally relative to an upstream end face of the NOx catalyst is wider than a width in a direction extending perpendicular to the upstream end face of the NOx catalyst.

2. The exhaust gas purifying apparatus according to claim 1, wherein the reducing agent is injected in a flat form along an upstream end face of the NOx catalyst from the nozzle hole.

3. The exhaust gas purifying apparatus according to claim 1, wherein the reducing agent is injected from the nozzle hole in such a manner that the reducing agent that has reached the upstream end face of the NOx catalyst, takes a form elongated in a predetermined direction on the upstream end surface and having a width narrowed in a direction perpendicular to the predetermined direction.

4. The exhaust gas purifying apparatus according to claim 1, wherein the nozzle hole is disposed outward from an outer periphery of the NOx catalyst.

5. The exhaust gas purifying apparatus according to claim 1, further comprising an exhaust gas introduction portion which is provided on an upstream side of the casing and is inclined relative to an upstream end face of the NOx catalyst in such a manner that the exhaust gas is introduced obliquely to the upstream end face, wherein
    the reducing agent supply device injects the reducing agent generally parallel to the exhaust gas flowing into the NOx catalyst and in the same direction as that of the flow of the exhaust gas.

6. The exhaust gas purifying apparatus according to claim 1, further comprising:
    an exhaust gas control valve switchable between a position at which the flow of the exhaust gas into the NOx catalyst is allowed and a position at which the flow of the exhaust gas is inhibited; and
    an operation control device which controls an operation of the exhaust gas control valve, wherein
    the operation control device switches the exhaust control valve to the position at which the flow of the exhaust gas into the NOx catalyst is inhibited at a time of rich spike in which an air-fuel ratio of the exhaust gas is temporarily set to a rich side and thereafter controls an operation of the reducing agent supply device in such a manner that the reducing agent is added to the exhaust passage after space velocity in the NOx catalyst begins to decrease.

7. An exhaust gas purifying apparatus for an internal combustion engine, comprising:
    an exhaust pipe which forms a part of an exhaust passage of the internal combustion engine and has a plurality of branch pipes branching off from the same upstream pipe;
    a plurality of casings, each of which is provided in each branch pipe and houses therein an occlusion-reduction type NOx catalyst; and
    a plurality of reducing agent supply devices, each of which is provided on each casing and supplies a reducing agent to an interior of the casing on an upstream side of the NOx catalyst, wherein
    each reducing agent supply device injects the reducing agent in a flat form in a direction intersecting a center line of the NOx catalyst from a nozzle hole disposed in each casing, and
    the reducing agent is injected from the nozzle hole so as to take a form in which a width in a direction extending horizontally relative to an upstream end face of the NOx catalyst is wider than a width in a direction extending perpendicular to the upstream end face of the NOx catalyst.

8. The exhaust gas purifying apparatus according to claim 7, wherein the reducing agent is injected in a flat form along an upstream end face of the NOx catalyst from the nozzle hole.

9. The exhaust gas purifying apparatus according to claim 7, wherein the reducing agent is injected from the nozzle hole in such a manner that the reducing agent, which has reached the upstream end face of the NOx catalyst, takes a form elongated in a predetermined direction on the upstream end surface and narrowed in a width in a direction perpendicular to the predetermined direction.

10. The exhaust gas purifying apparatus according to claim 7, wherein the nozzle hole is disposed outward from an outer periphery of the NOx catalyst.

11. The exhaust gas purifying apparatus according to claim 7, wherein an exhaust gas introduction portion which is inclined relative to an upstream end face of the NOx catalyst is provided on an upstream side in such a manner that the exhaust gas is introduced obliquely to the upstream end face, and
    each reducing agent supply device injects the reducing agent generally parallel to the exhaust gas flowing into the NOx catalyst and in the same direction as that of the flow of the exhaust gas.

12. The exhaust gas purifying apparatus according to claim 7, further comprising:
    a plurality of exhaust gas control valves, each of which is switchable between a position at which the flow of the exhaust gas into the NOx catalyst is allowed and a position at which the flow of the exhaust gas is inhibited; and
    an operation control device which controls operations of the exhaust gas control valves, wherein
    the operation control device switches each of the exhaust control valves to the position at which the flow of the exhaust gas into the NOx catalyst is inhibited at a time of rich spike in which an air-fuel ratio of the exhaust gas is temporarily set to a rich side to reduce an NOx occluded in the NOx catalyst and thereafter controls an operation of each of the reducing agent supply devices in such a manner that the reducing agent is added to the NOx catalyst after space velocity in the NOx catalyst begins to decrease.

* * * * *